(12) United States Patent
Diels et al.

(10) Patent No.: US 11,498,112 B1
(45) Date of Patent: Nov. 15, 2022

(54) ROLLER PRESS ASSEMBLY AND METHOD

(71) Applicant: DRiV Automotive Inc., Lake Forest, IL (US)

(72) Inventors: Bert Louis Jozef Diels, Geel (BE); Frederic Frans S Op de Beeck, Herenthout (BE)

(73) Assignee: DRiV Automotive Inc., Skokie, IL (US)

( * ) Notice: Subject to any disclaimer, the term of this patent is extended or adjusted under 35 U.S.C. 154(b) by 0 days.

(21) Appl. No.: 17/375,221

(22) Filed: Jul. 14, 2021

(51) Int. Cl.
*B21D 39/04* (2006.01)

(52) U.S. Cl.
CPC .... *B21D 39/048* (2013.01); *B60G 2206/8209* (2013.01); *F16F 2226/04* (2013.01)

(58) Field of Classification Search
CPC ...... B21D 41/04; B21D 39/04; B21D 41/045; B21D 39/048; F16F 9/3271; F16F 1/3842; F16F 2226/04; B21H 1/18; B21J 5/00; B21J 5/12; B21J 9/025; B21K 21/12; G11B 33/127; Y10T 29/49922; B60G 2206/8209
See application file for complete search history.

(56) References Cited

U.S. PATENT DOCUMENTS

| 4,294,097 A * | 10/1981 | Gombas | B65D 7/04 72/94 |
|---|---|---|---|
| 5,598,905 A | 2/1997 | Rudloff | |
| 5,715,139 A | 2/1998 | Gardner | |
| 5,990,441 A | 11/1999 | Zaenglein et al. | |
| 6,167,983 B1 | 1/2001 | Wunderlich et al. | |
| 6,581,651 B2 * | 6/2003 | Kim | F16F 9/43 141/37 |
| 8,211,348 B2 | 7/2012 | Kuki et al. | |

FOREIGN PATENT DOCUMENTS

| CN | 205324517 U | 6/2016 |
|---|---|---|
| CN | 207222773 U | 4/2018 |
| JP | 2006159250 A | 6/2006 |
| KR | 100476723 B1 | 3/2005 |
| KR | 200466559 Y1 | 4/2013 |

* cited by examiner

*Primary Examiner* — Lee A Holly
(74) *Attorney, Agent, or Firm* — DRiV Automotive Inc.

(57) ABSTRACT

An assembly for securing a component of a damper assembly includes a press movable along an axis from a retracted position to an extended position. The assembly includes a plurality of rollers rotatably supported at an end of the press. The rollers have an outer circumferential surface that includes a middle portion extending, in cross-section, transversely to the axis and linearly between an entry portion and a top portion of the outer circumferential surface.

19 Claims, 10 Drawing Sheets

ROLLER PRESS ASSEMBLY AND METHOD

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

DETAILED DESCRIPTION

An assembly for securing components of a damper assembly includes a press movable along an axis from a retracted position to an extended position. The assembly includes a plurality of rollers rotatably supported at an end of the press. The rollers have an outer circumferential surface that includes a middle portion extending, in cross-section, transversely to the axis and linearly between an entry portion and a top portion of the outer circumferential surface. The middle portion of the rollers form a middle portion of, for example, a housing. The middle portion stiffens an end of the housing such that a weld (or other fixation such as a threaded connection) may not be necessary to secure the end of the housing.

Figure 1:
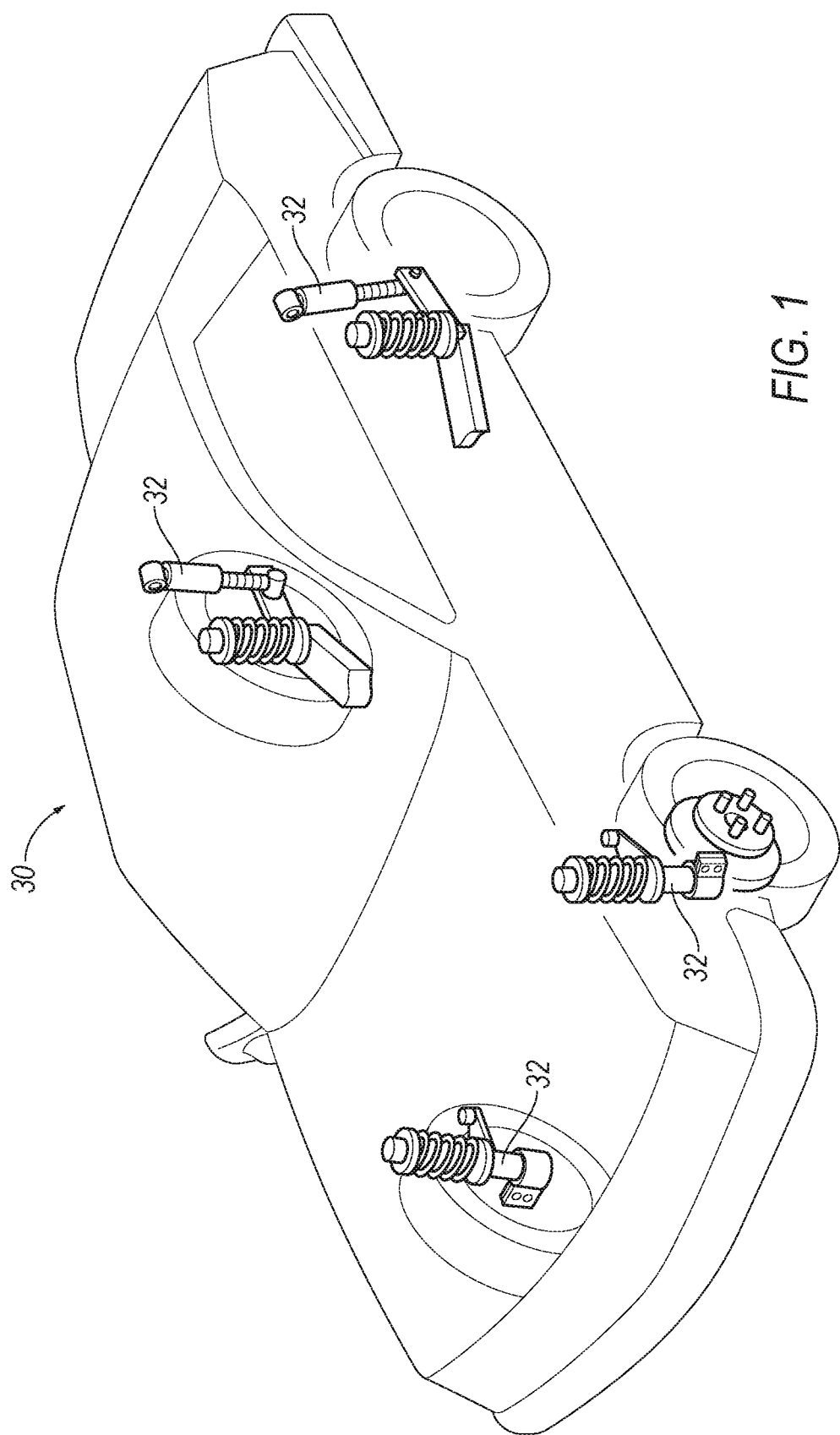
FIG. 1 is a perspective view of a vehicle having a plurality of damper assemblies.

With reference to FIG. 1, and wherein like numerals indicate like elements throughout the several views, a vehicle 30 having a plurality of damper assemblies 32 is shown. The vehicle 30 may be any suitable type of ground vehicle, e.g., a passenger or commercial automobile such as a sedan, a coupe, a truck, a sport utility, a crossover, a van, a minivan, a taxi, a bus, etc.

The damper assemblies 32 are typically used in conjunction with automotive suspension systems or other suspension systems to control movement of wheels of the vehicle 30 relative to a body of the vehicle 30. In order to control movement, damper assemblies 32 are generally connected between the sprung (body) and the unsprung (suspension/drivetrain) masses of the vehicle 30. Each damper assembly 32 may be coupled with a coil spring. Each damper assembly 32 is movable from a compressed position to an extended position, and vice versa. A distance between ends 48 of the damper assembly 32, i.e., the distance from one end 48 to the other end 48, is less in the compressed position than in the extended position. The coil springs, or the like, may urge the damper assemblies 32 toward the extended positions. Force applied to wheels of the vehicle 30, e.g., from bumps, potholes, etc., may urge to damper assemblies 32 toward the compressed position.

Each damper assembly 32 controls movement of respective wheels by limiting fluid flow into, out of, and/or between various chambers of the damper assembly 32, e.g., into, out of, and/or between a compression chamber and a rebound chamber, between a reserve chamber and the compression chamber and/or the rebound chamber, etc. Fluid movement is caused by movement of a piston within a pressure tube of the damper assembly 32, e.g., when the damper assembly 32 is moved toward the compressed position or the extended position.

Figure 2:
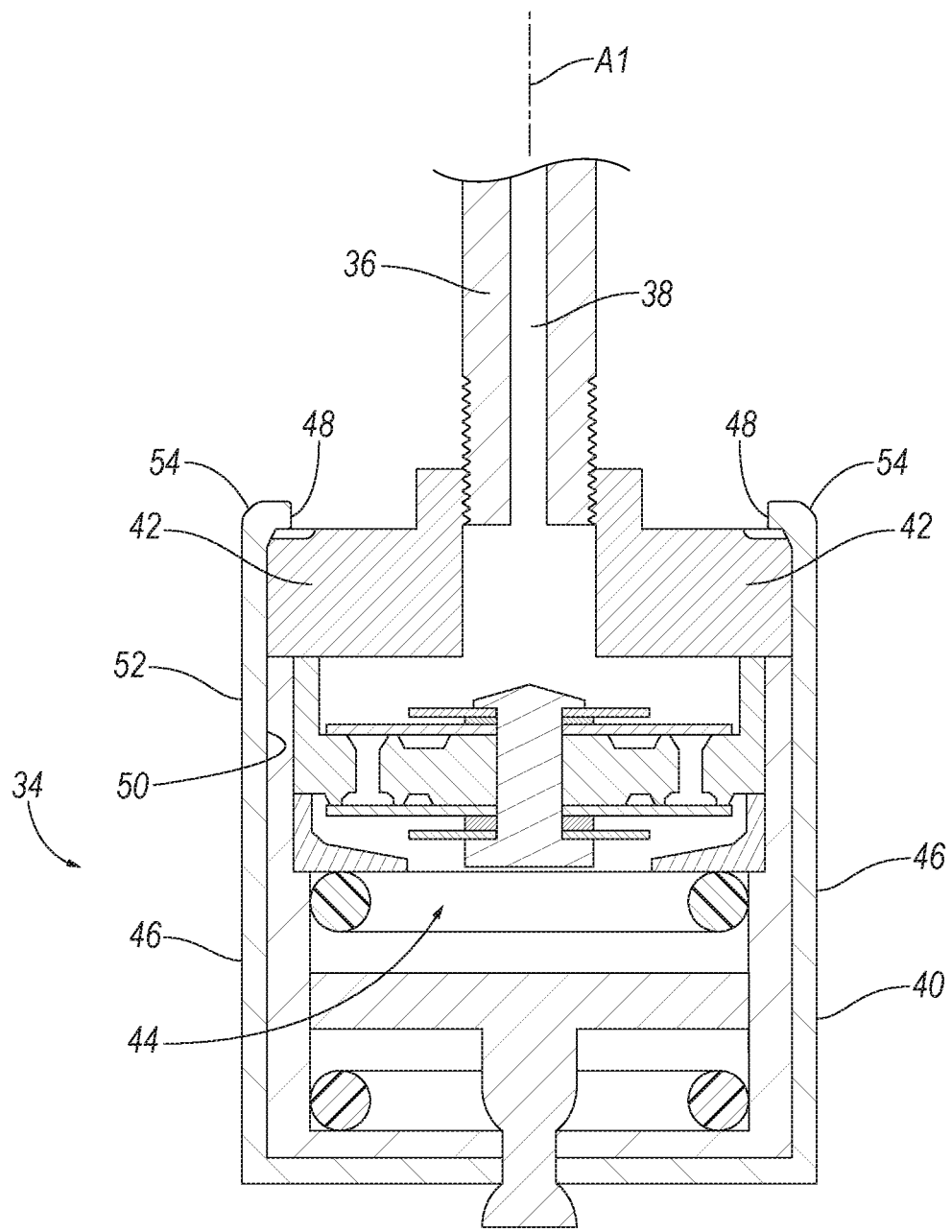
FIG. 2 is a cross-section of components of one of the damper assemblies, the components including a rod and a valve assembly.
Figure 3A:
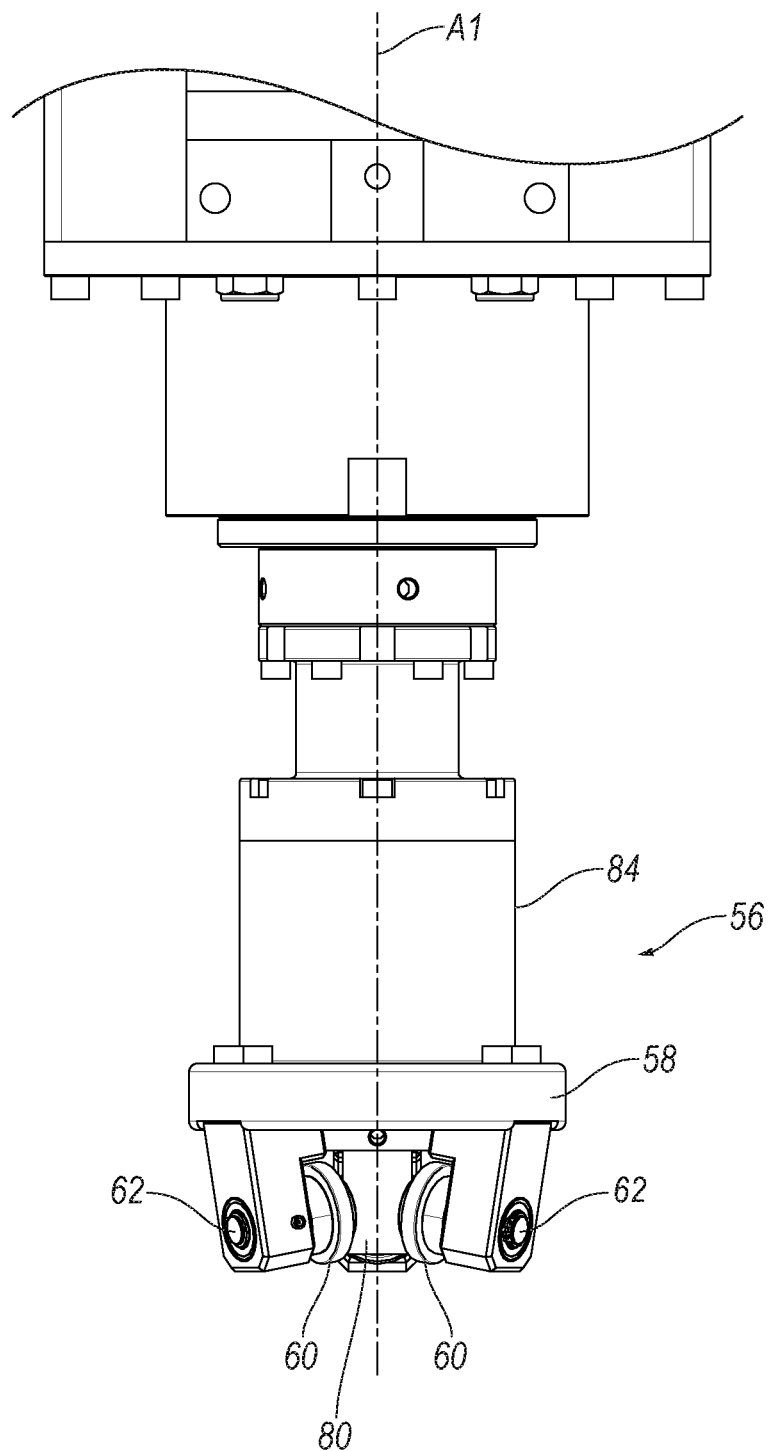
FIG. 3A is a side view of a press having rollers for assembly of the damper assembly, the press in a retracted position.
Figure 3B:
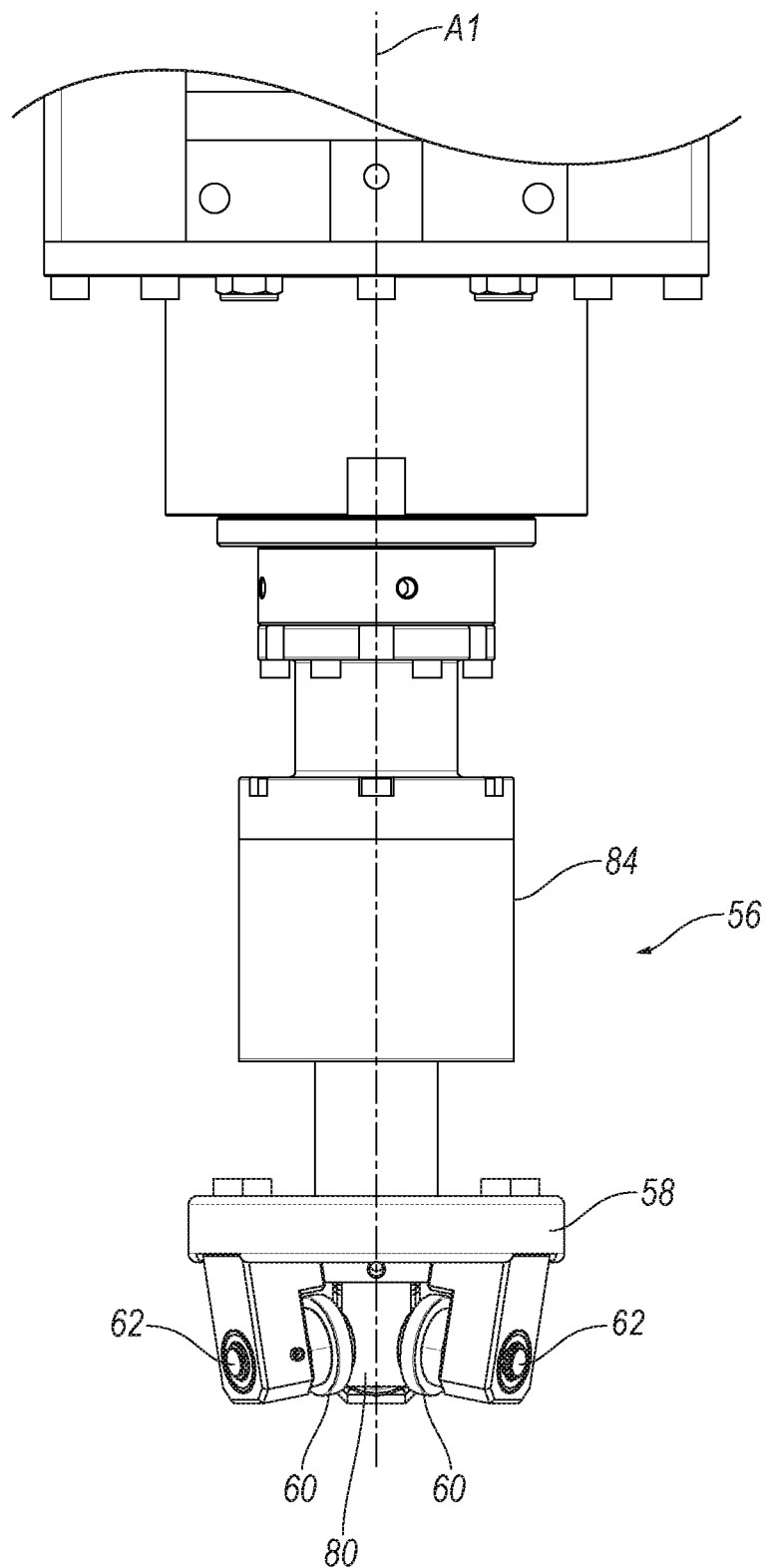
FIG. 3B is a side view of the press in an extended position.

Each damper assembly 32 may include one or more valve assemblies that control fluid flow, e.g., through one or more passages 38 connecting the rebound chamber, the compression chamber, and/or the reserve chamber. The valve assemblies may include springs, blow-off discs, restriction discs, etc. For example, and with reference to FIG. 2, a rod end valve assembly 34 is shown. The rod end valve assembly 34 is secured to an end of a hollow piston rod 36, e.g., controlling fluid flow into and out a passage 38 of the piston rod 36.

The rod end valve assembly 34 includes a housing 40 and a body 42 that enclose other components 44, e.g., springs, valve discs, etc., therein. The body 42 threadedly engages the piston rod 36. The housing 40 can include an outer cylindrical body 46 and an end 48 extending radially inward from the outer cylindrical body 46. The end 48 maintains the body 42 within the outer cylindrical body 46, e.g., compressing the components 44 therein between the body 42 and a bottom of the housing 40. The housing 40 defines a wall thickness, e.g., between an inner surface 50 of the housing 40 that faces toward the other components 44 of the rod end valve assembly 34 and an outer surface 52 of the housing 40 that faces away from the other components 44.

The housing 40 can include a housing middle portion 54 extending linearly between the end 48 and the outer cylindrical body 46. The housing middle portion 54 provides increased strength and stiffness to the housing 40, e.g., relative to a continuous bend connecting the outer cylindrical body 46 and the end 48. The increased strength and stiffness may enable the end 48 to maintain the body 42 in position and provide preload compression force to the components 44 within the housing 40, e.g., without requiring a weld or the like (such as a threaded connection between the body 42 and the housing 40) securing the end 48 to the body 42. A length of the housing middle portion 54 at the outer surface 52 is equal to or greater than the wall thickness. The middle portion 72 is formed by bending the end 48 from an initial position, shown in FIGS. 5A and 5B to a finished position, shown in FIGS. 2, 6A, and 6B.

With reference to FIGS. 3A-6B, a press 56 for bending the end 48 of the housing 40 from the initial position to the finished position is shown. The press 56, e.g., a head unit 58 at an end 48 of the press 56, is movable along an axis A1 from a retracted position, shown in FIGS. 3A and 5A, to an extended position, shown in FIGS. 3B and 6A. The press 56 generates force along the axis A1. The press 56 may include a piston and cylinder, e.g., that is actuated via hydraulic or pneumatic operation. The press 56 may include a rack and pinion gear, e.g., that is actuated via an electric motor and reduction gears. The press 56 may include any other suitable structure for providing force along the axis A1. The press 56 rotates about the axis A1. For example, the press 56 may include an electric motor, reduction gears, or any other suitable structure that rotates the head unit 58 about the axis A1 and relative to a main body 84 of the press 56. The axis A1 may extend through a center of the head unit 58.

A plurality of rollers 60 are rotatably supported at the end 48 of the press 56. Each of the rollers 60 may be rotatable about a respective one of a plurality of second axes A2. For example, each roller 60 of the plurality of rollers 60 may be rotatably supported by the head unit 58 via an axle pin 62 and one or more bearings (or other suitable structure). Each axle pin 62 maybe elongated along the respective second axis A2. The second axes A2 are transverse to, i.e., not parallel with, the axis A1. The second axes A2 may not be perpendicular to the axis A1. For example, an angle α defined by the axis A1 and one of the second axes A2, measured radially toward the roller 60 and axially toward the main body 84, may be greater than 90 degrees.

Figure 4:
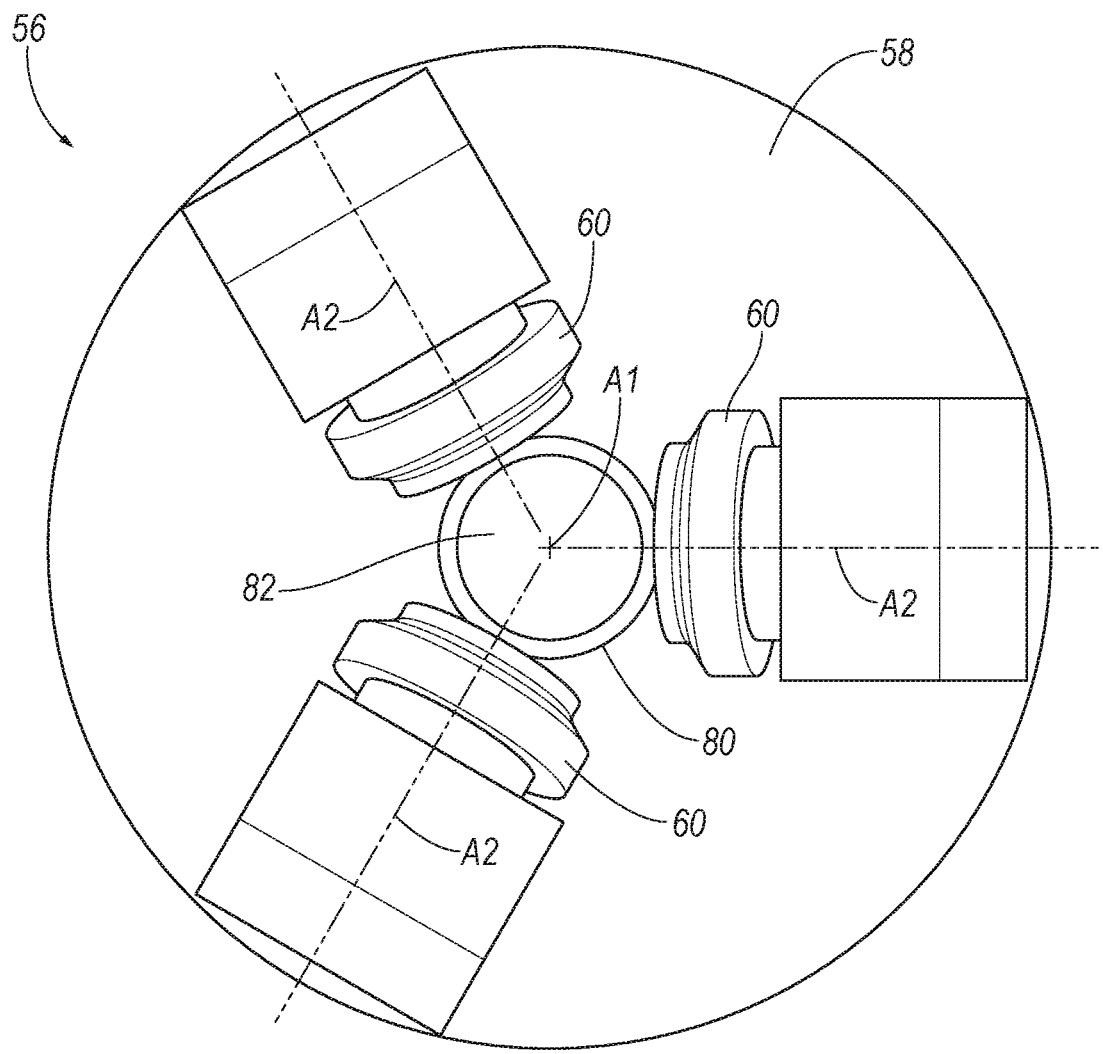
FIG. 4 is a bottom view of a head unit of the press supporting the rollers.

With defence to FIG. 4, the rollers 60 are radially spaced from the axis A1 by a common distance. For example, a radial distance from the axis A1 at the center of the head unit 58 to one of the rollers 60 is the same as the radially distance from the axis A1 at the center of the head unit 58 to another of the rollers 60. The common distance may be equal to an outer radius of the housing 40, e.g., such that the rollers 60 can concurrently abut the outer cylindrical body 46 of the housing 40. The rollers 60 are equally spaced from each other about the axis A1. For example, a circumferential distance (e.g., an angular distance) about the axis A1 between a first pair of rollers 60 may be equal to the circumferential distance between a second pair of rollers 60. The common distance from the axis A1, and equal spacing about the axis A1, enable balanced application of force from the press 56 to the housing 40, e.g., such that the rollers 60 apply force along the axis A1 without apply unbalanced torque to the housing 40.

With reference to FIGS. 5A-6B, each roller 60 includes an opposing pair of end faces 64 and an outer circumferential surface 66. The end faces 64 of each roller 60 are spaced from each other the respective second axis A2. For example, the axle pin 62 supporting the roller 60 may extend through the roller 60 from one of the end faces 64 to the other of the end faces 64. The end faces 64 extend radially outward, e.g., from the axle pin 62 to the outer circumferential surface 66 of the respective roller 60. The outer circumferential surface 66 extends from one of the end faces 64 to the other of the end faces 64. The outer circumferential surface 66 surrounds the respective second axis A2.

Figure 5A:
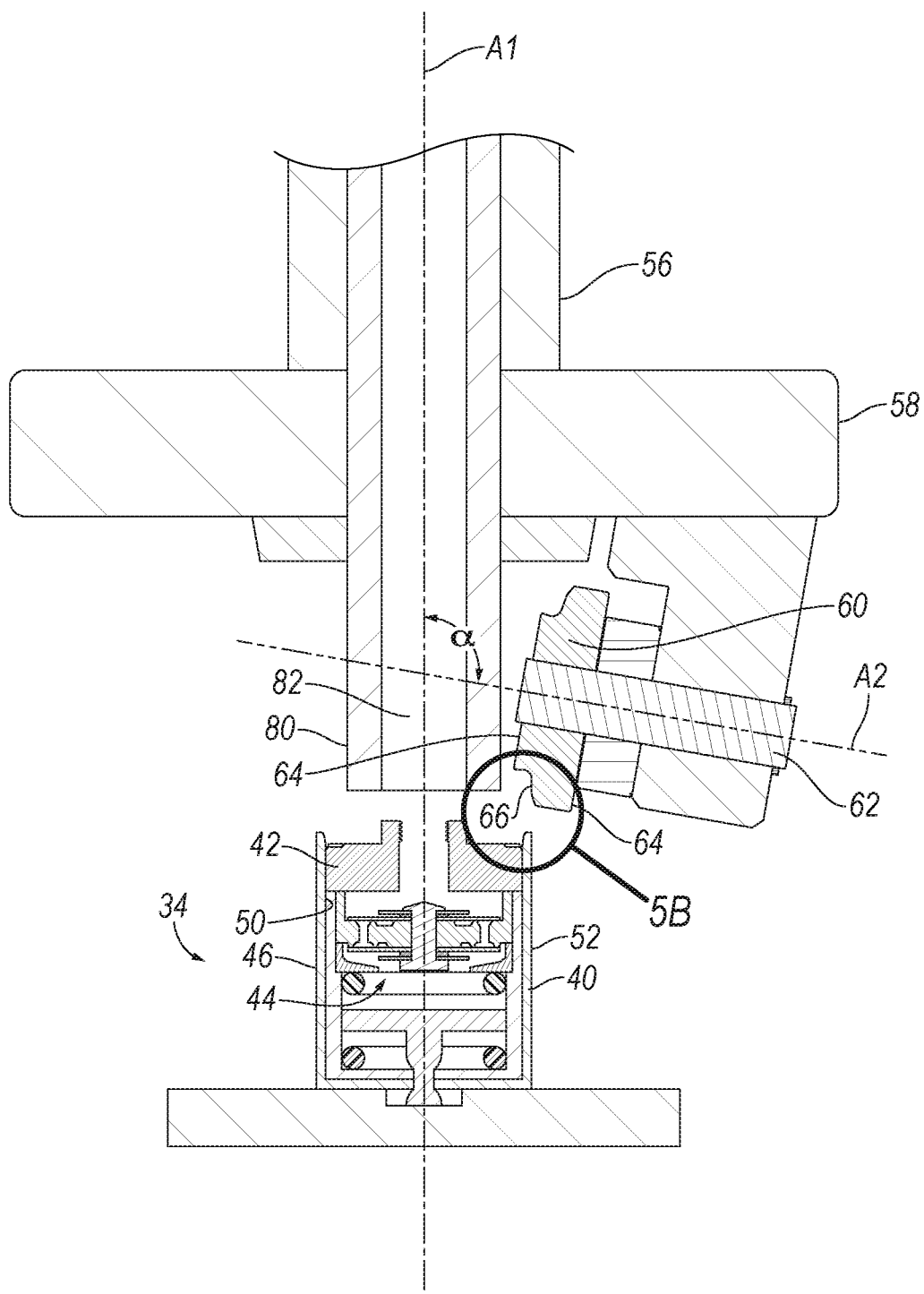
FIG. 5A is a side view of the valve assembly of the damper assembly and the presses in the retracted position.
Figure 5B:
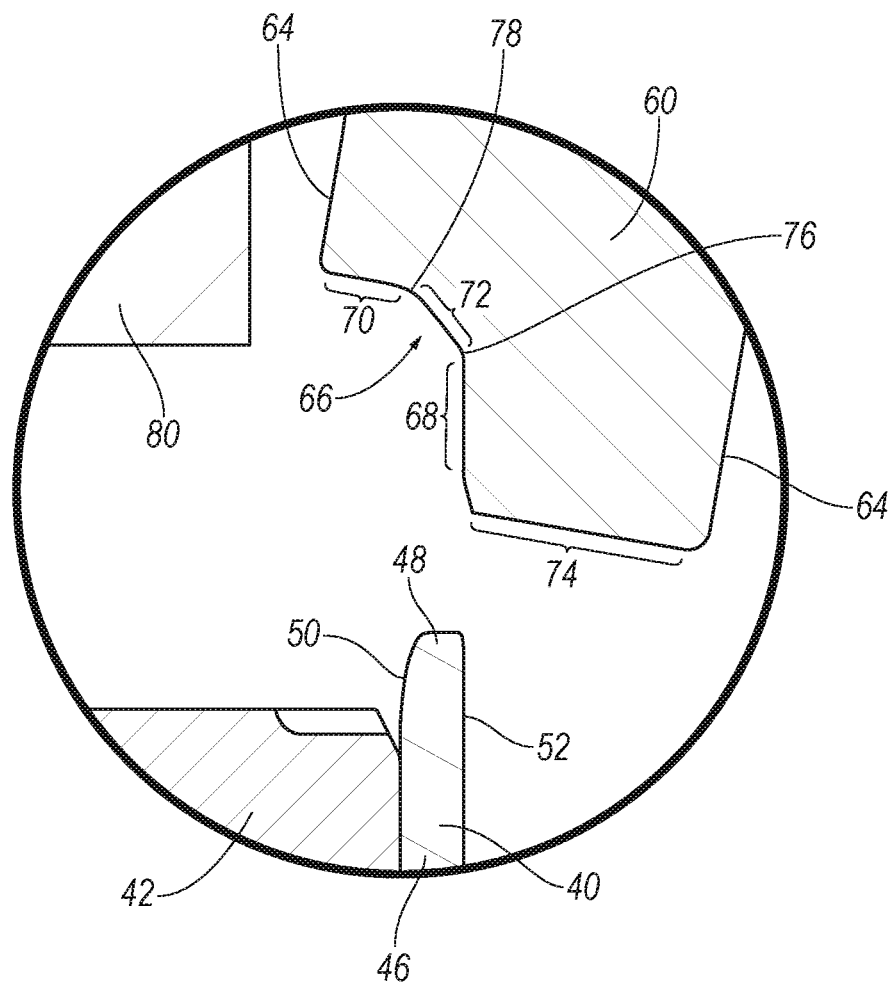
FIG. 5B is a close up of a portion of FIG. 5A.
Figure 6A:
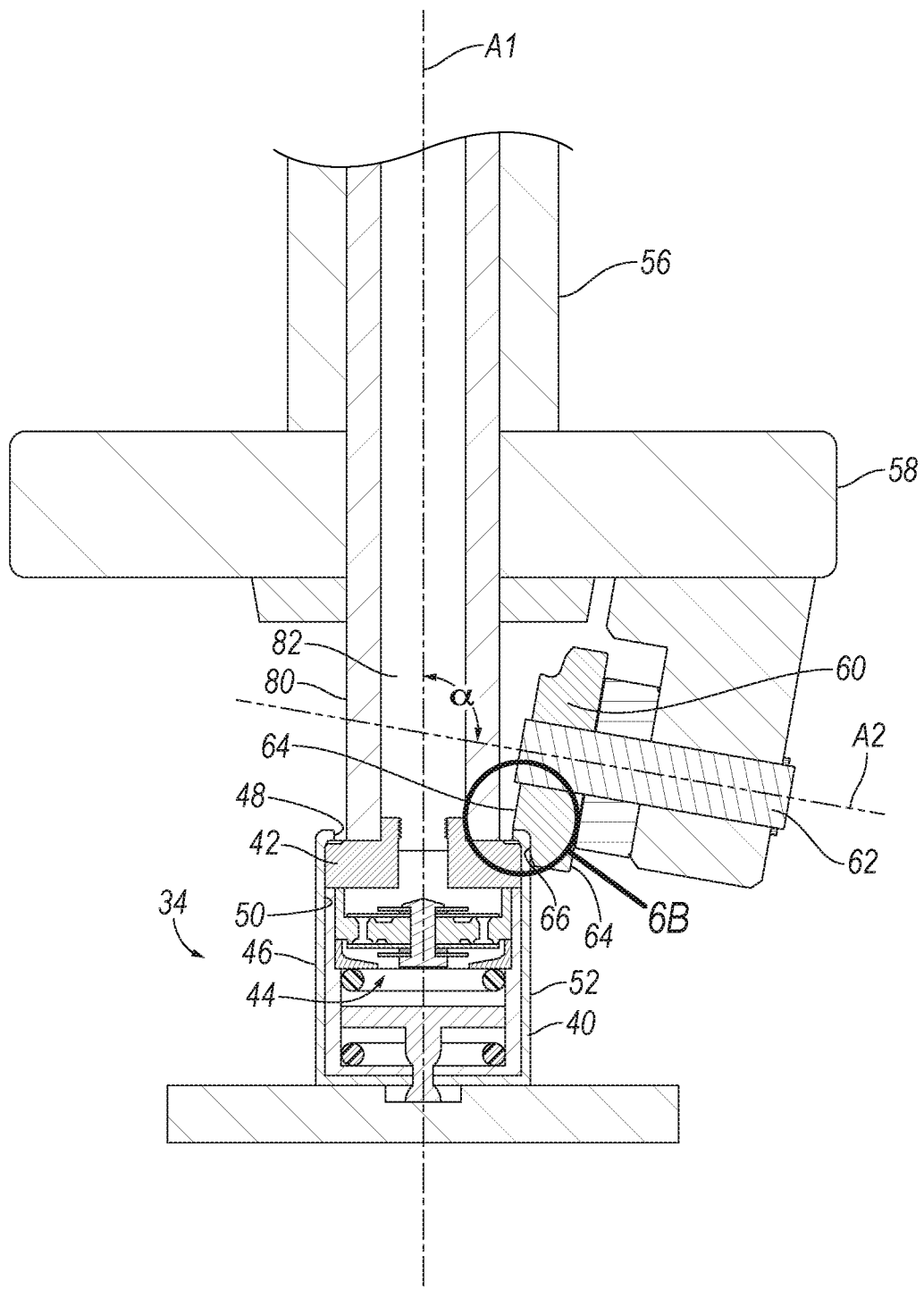
FIG. 6A is a side view of the valve assembly of the damper assembly and the presses in the extended position.
Figure 6B:
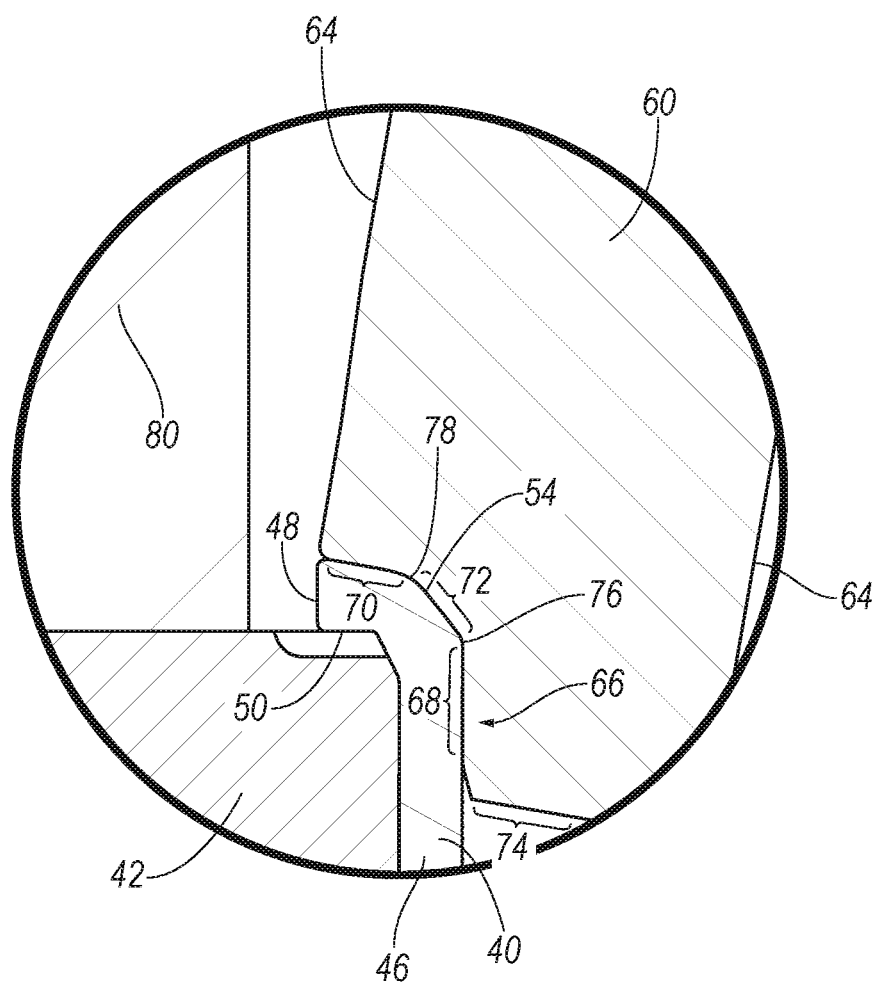
FIG. 6B is a close up of a portion of FIG. 6A.

With reference to FIGS. 5B and 6B, the outer circumferential surface 66 includes an entry portion 68, a top portion 70, and a middle portion 72 therebetween. For example, the top portion 70 may be radially inward of the middle portion 72 and the entry portion 68 may be radially outward of the middle portion 72, relative to the second axis A2. The outer circumferential surface 66 may include a bottom portion 74 that is radially outward of the entry portion 68 relation to the second axis A2.

The entry portions 68 of the outer circumferential surface 66 of the rollers 60 receive the end 48 of the housing 40 when the press 56 and the roller 60 are used to bend the end 48 from the initial position to the finished position. The entry portion 68 may contact the outer cylindrical body 46 of the housing 40, e.g., after bending the end 48 and as shown in FIGS. 6A and 6B. The entry portion 68 extends along parallel to the axis A1 of the press 56, e.g., where the roller 60 contacts the outer circumferential surface 66 of the housing 40. The cross-section is taken along a plane that contains both the axis A1 of the press 56 and the second axis A2 of the roller 60. The entry portion 68 may be linear in cross-section, e.g., extending between the middle portion 72 and the bottom portion 74. The roller 60 may include a curve, chamfer, and/or other bevel connecting the entry portion 68 to the bottom portion 74.

The top portions 70 of the outer circumferential surfaces 66 of the rollers 60 correspond to the end 48 of the housing 40 in the finished position. For example, geometry of the top portion 70 may mirror geometry of the end 48 of the housing 40. As another example, the top portion 70 of the roller 60 may, in cross-section, generally continuously the abut the end 48 of the housing 40. The top portions 70 provide the finished position of the end 48 of the housing 40. The top portion 70 contacts the end 48 of the housing 40, e.g., after bending the end 48. The top portion 70 may extend perpendicular to the axis A1 of the press 56, e.g., where the roller 60 contacts the end 48 the housing 40 in the finished position. The top portion 70 may be linear in cross-section, e.g., extending between the adjacent end face 64 of the roller 60 and the middle portion 72 of the outer circumferential surface 66. The roller 60 may include a curve, chamfer, and/or other bevel connecting the end face 64 to the top portion 70.

The middle positions of the outer circumferential surface 66 of the rollers 60 provide the housing middle portion 54. The middle portions 72 correspond to the housing middle portion 54 when the end 48 is at the finished position. For example, geometry of the middle portion 72 may mirror geometry of the housing middle portion 54. As another example, the middle portion 72 of the roller 60 may, in cross-section, generally continuously the abut the housing middle portion 54 between the end 48 and the outer cylindrical body 46. The middle portion 72 of the outer circumferential surface 66 extends in cross-section linearly between the entry portion 68 and the top portion 70. The middle portion 72 between the entry portion 68 and the top portion 70 is at least as long as the wall thickness of the housing 40. The middle portion 72 in cross-section extends transversely to the axis A1. For example, the middle portion 72 and the axis A1 may define an angle of 25 to 65 degrees, e.g., as measured between the axis A1 and where the roller 60 contacts the housing 40. The middle portion 72 extends circumferentially about the second axes A2 of the respective roller 60, e.g., along an entire perimeter of the outer circumferential surface 66. For example, the middle portion 72 may be frustoconical and centered on the respective second axis A2.

The outer circumferential surface 66 can include a first curve 76 between the middle portion 72 and the entry portion 68 and/or a second curve 78 between the middle portion 72 and the top portion 70. The first curve 76 and the second curve 78 guide bending of the housing 40 from the entry portion 68 to the middle portion 72 and from the middle portion 72 to the top portion 70. Radii of the first curve 76 and the second curve 78 may be predetermined, for example, based on a material of the housing 40, the wall thickness, of the housing 40, etc.

The press 56 may include a center tube 80 extending downward from the head unit 58 along the axis A1. The center tube 80 may, for example, press the body 42 downward was the rollers 60 bend the end 48 of the housing 40. The center tube 80 may be spring loaded and moveable along the axis A1 relative to the head unit 58, e.g., with a spring urging the center tube 80 away from the main body 84 of the press 56. The center tube 80 may include a center passage 82. A portion of the body 42 may be received in center passage 82 the center tube 80.

Figure 7:
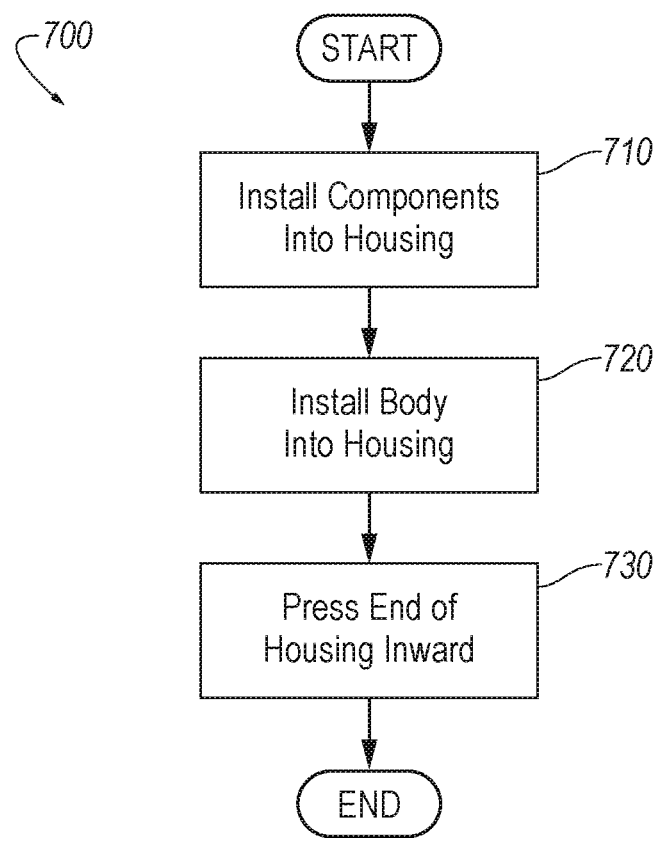
FIG. 7 is a flow chart illustrating a process for assembling the valve assembly of the damper assembly.

With reference to FIG. 7, a flowchart illustrating a process 700 for securing the housing 40 and body 42 of the damper assembly 32 is shown. The housing 40 is secured to the body 42 without, i.e., the process 700 does not include, a welding operation.

The process 700 begins at a block 710 where the components 44 are installed into the housing 40 before the end 48 of the housing 40 is bent inward, as shown by the housing 40 in FIGS. 5A and 5B. The components 44 may be installed by hand, by machine, or other suitable method.

Next, at a block 720, the body 42 is installed into the housing 40 blank. The body 42 may be installed by hand, by machine, or other suitable method.

Next, at a block 730 the end 48 of the housing 40 is pressed inward with the press 56 and the rollers 60. For example, the housing 40 may be positioned below the press 56 and aligned on the axis A1. Then, the press 56 may be actuated to the extend position while the rollers 60 are rotated about the axis A1. The middle portion 72 of the rollers 60 from the housing middle portion 54 and bend the end 48 inward, applying preload forces to the body 42 and the components 44.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly for securing a component of a damper assembly, comprising:
    a press movable along an axis from a retracted position to an extended position; and
    a plurality of rollers rotatably supported at an end of the press, each of the rollers rotatable about a respective one of a plurality of second axes;
    the rollers having an outer circumferential surface that includes a middle portion extending, in cross-section, transversely to the axis and linearly between an entry portion and a top portion of the outer circumferential surface, the entry portion radially outward of the middle portion relative to the respective one of the plurality of second axes.

2. The assembly of claim 1, wherein the entry portion extends along the axis.

3. The assembly of claim 2, wherein the top portion extends perpendicular to the axis and perpendicular to the entry portion circumferentially about the respective one of the plurality of second axes.

4. The assembly of claim 1, wherein the outer circumferential surface includes a curve between the middle portion and the entry portion.

5. The assembly of claim 4, wherein the outer circumferential surface includes a second curve between the middle portion and the top portion.

6. The assembly of claim 1, wherein the press rotates about the axis, and the rollers are spaced from the axis by a common distance.

7. The assembly of claim 6, wherein the rollers are equally spaced from each other about the axis.

8. The assembly of claim 6, wherein the common distance is equal to a radius of a housing pressed by the rollers.

9. The assembly of claim 1, wherein the second axes are transverse to the axis.

10. The assembly of claim 9, wherein the second axes are not perpendicular to the axis.

11. The assembly of claim 1, further comprising a valve assembly enclosed by a housing of the damper assembly, the housing pressed by the rollers.

12. The assembly of claim 11, wherein the valve assembly is secured to a rod of the damper assembly.

13. The assembly of claim 1, wherein a housing pressed by the rollers includes an outer cylindrical body and an end extending radially inward from the outer cylindrical body, the end corresponding to the top portion of the outer circumferential surface of the rollers.

14. The assembly of claim 13, wherein the housing includes a housing middle portion extending linearly between the end and the outer cylindrical body, the housing middle portion corresponding to the middle portions of the rollers.

15. The assembly of claim 1, wherein the middle portions extend circumferentially about the second axes.

16. The assembly of claim 1, wherein the middle portion and the axis define an angle of 25 to 65 degrees.

17. The assembly of claim 1, wherein the middle portion between the entry portion and the top portion is at least as long as a wall thickness of a housing pressed by the rollers.

18. An assembly for securing a component of a damper assembly, comprising:
    a press movable along an axis from a retracted position to an extended position, and
    a plurality of rollers rotatably supported at an end of the press;
    the rollers having an outer circumferential surface that includes a middle portion extending, in cross-section, transversely to the axis and linearly between an entry portion and a top portion of the outer circumferential surface and wherein the middle portion and the axis define an angle of 25 to 65 degrees.

19. An assembly for securing a component of a damper assembly, comprising:
    a press movable along an axis from a retracted position to an extended position;
    a plurality of rollers rotatably supported at an end of the press, the rollers having an outer circumferential surface that includes a middle portion extending, in cross-section, transversely to the axis and linearly between an entry portion and a top portion of the outer circumferential surface; and
    a valve assembly enclosed by a housing of the damper assembly, the housing pressed by the rollers.

* * * * *